US009639263B2

(12) United States Patent
Bloch et al.

(10) Patent No.: US 9,639,263 B2
(45) Date of Patent: May 2, 2017

(54) NATIVE OVERLAY FOR RAPID EDITING OF WEB CONTENT

(71) Applicant: Weebly, Inc., San Francisco, CA (US)

(72) Inventors: Benjamin A. Bloch, San Francisco, CA (US); Timothy J. Snyder, San Francisco, CA (US); Scott A. Garman, San Francisco, CA (US); John D. Rusenko, Jr., San Francisco, CA (US); Joseph Matthew Fox, San Francisco, CA (US)

(73) Assignee: Weebly, Inc., San Francisco, CA (US)

( * ) Notice: Subject to any disclaimer, the term of this patent is extended or adjusted under 35 U.S.C. 154(b) by 185 days.

(21) Appl. No.: 14/452,390

(22) Filed: Aug. 5, 2014

(65) Prior Publication Data
US 2016/0041954 A1 Feb. 11, 2016

(51) Int. Cl.
*G06F 3/0486* (2013.01)
*G06F 3/0488* (2013.01)
*G06F 17/30* (2006.01)

(52) U.S. Cl.
CPC ........ *G06F 3/04883* (2013.01); *G06F 3/0486* (2013.01); *G06F 17/30905* (2013.01)

(58) Field of Classification Search
None
See application file for complete search history.

(56) References Cited

U.S. PATENT DOCUMENTS

| 6,304,886 B1 | 10/2001 | Bernardo et al. |
| 2001/0045949 A1 | 11/2001 | Chithambaram et al. |
| 2003/0121004 A1 | 6/2003 | Christensen et al. |
| 2005/0015722 A1 | 1/2005 | Niyogi et al. |
| 2007/0294644 A1 | 12/2007 | Yost |
| 2010/0037168 A1 | 2/2010 | Thayne et al. |
| 2012/0102176 A1 | 4/2012 | Lee et al. |

(Continued)

FOREIGN PATENT DOCUMENTS

EP 0651543 B1 9/2008

OTHER PUBLICATIONS

Wollman, Dana; "Chrome OS review (version 19)"; May 29, 2012; Engadget; https://www.engadget.com/2012/05/29/chrome-os-review-version-19/.*

(Continued)

*Primary Examiner* — Asher Kells
(74) *Attorney, Agent, or Firm* — Fenwick & West LLP

(57) ABSTRACT

A web rendering module in the operating system is used to render and display a web page. The web rendering module also generates layout data that describes the position and size of each visual element on the rendered web page. A web editing application uses the layout data to generate a native overlay. The native overlay is an arrangement of cells, and each cell has the same position and size as a respective visual element. The application displays the native overlay on top of the rendered web page so that each visual element on the web page is aligned with a cell in the native overlay. The cells in the native overlay are transparent so that the rendered web page remains visible to the user, but the native overlay captures any interactions that the user performs. The interactions are then processed to make a corresponding change to the web page.

17 Claims, 15 Drawing Sheets

(56) References Cited

U.S. PATENT DOCUMENTS

| | | | |
|---|---|---|---|
| 2012/0290959 A1* | 11/2012 | Quine | G06F 8/34 715/765 |
| 2013/0091417 A1 | 4/2013 | Cordasco | |
| 2013/0222275 A1 | 8/2013 | Byrd et al. | |
| 2013/0268872 A1 | 10/2013 | Yin et al. | |
| 2014/0019848 A1 | 1/2014 | Le Bescond De Coatpont et al. | |
| 2014/0372923 A1* | 12/2014 | Rossi | G06F 3/0486 715/769 |
| 2015/0169518 A1* | 6/2015 | Antipa | G06F 17/3089 715/240 |

OTHER PUBLICATIONS

PC T International Search Report and Written Opinion for PCT/US2015/022818, Jun. 29, 2015, 19 Pages.

* cited by examiner

NATIVE OVERLAY FOR RAPID EDITING OF WEB CONTENT

BACKGROUND

1. Technical Field

This invention pertains in general to editing web content, and in particular to generating a native overlay that allows a user to make edits to a web page.

2. Description of Related Art

In many parts of the world, people have come to expect every organization, event, and public figure to have a website. As a result, many web editing applications have been developed to allow users who are unfamiliar with HTML, XML, Javascript, CSS, or other web design tools to create and maintain professional and aesthetically pleasing websites. Some of these web editing applications allow users to change or add content to a web page.

Conventional web editing applications require a considerable amount of computing resources because they use a web rendering engine to render changes to a web page as the user makes edits. As a result, they are typically configured to run on computing devices with substantial computational power, such as laptop and desktop computers. However, many users prefer to use tablet computers, smartphones, and other mobile devices to perform their computing tasks. For example, users may favor the flexibility of working in different locations or the intuitive touchscreen interface that is present on most modern-day mobile devices.

One critical drawback to mobile devices is that they generally have limited computing power. As a result, they are poorly-suited to running web editing applications. Although most mobile operating systems include a web rendering engine that is available to applications, web rendering engines on mobile devices are not responsive enough to render updates in real-time as a user makes edits to a web page.

SUMMARY

Embodiments of the invention include a method, a non-transitory computer readable storage medium, and a system for editing a web page by generating a native overlay that is displayed over a rendered web page. A web editing application executing on a client device interacts with a web rendering module in the operating system to render and display the web page. The web rendering module also generates layout data that describes the position and size of each visual element on the rendered web page, and the web editing application uses the layout data to generate the native overlay. The native overlay is an arrangement of cells, and each cell has the same position and size as a respective visual element. The web editing application displays the native overlay on top of the rendered webpage so that each visual element on the rendered web page is aligned with a cell in the native overlay.

In one embodiment, the cells in the native overlay are transparent. Thus, the rendered web page remains visible to the user, but the native overlay captures any interactions (e.g., tapping or pressing gestures) that the user performs, and the web editing application processes the interactions to make a corresponding change to the web page. For example, if the user performs a dragging gesture to move an image to a new position on the web page, the web page is updated so that the image is placed in the new position.

This process of capturing and processing user interactions on a web page can advantageously be used to provide a more responsive and interactive user interface. For example, when the user performs a long pressing gesture on a visual element, a screenshot is taken of the region of the rendered web page corresponding to the visual element. The screenshot can then be moved as the user performs a dragging gesture on the screen, which creates the illusion that the user is dragging the image on the rendered web page. The screenshot can be taken in this manner because the layout data, which is generated before the user interaction is received, can be used to determine the region of the rendered web page corresponding to the visual element.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Overview

Figure 1:
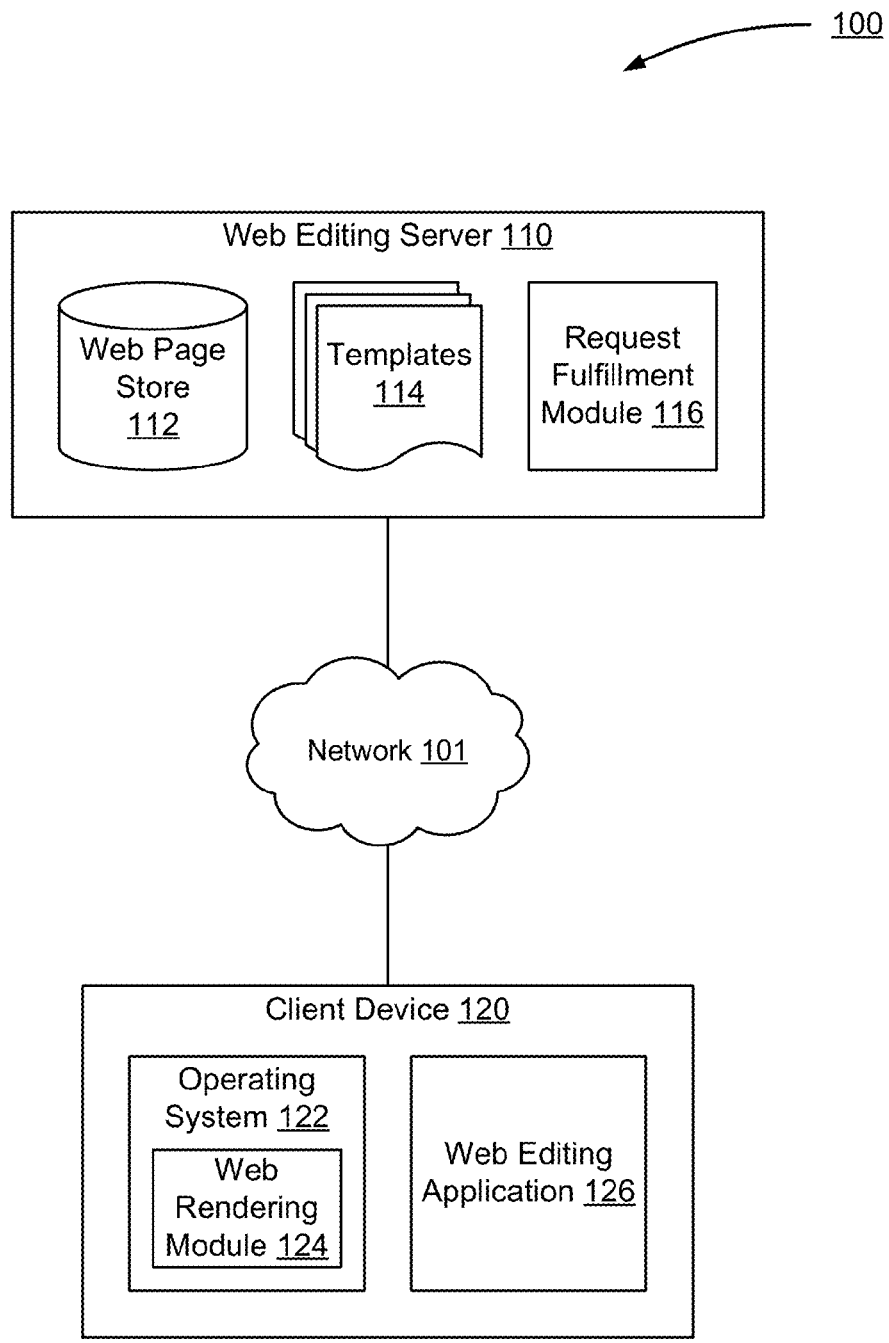
FIG. 1 is a block diagram of a computing environment for editing web content, in accordance with an embodiment.

FIG. 1 is a block diagram of a computing environment 100 for editing web content, in accordance with an embodiment. The computing environment 100 includes a web editing server 110 and a client device 120 connected by a network 101. Although only one web editing server 110 and one client device 120 are illustrated, in practice there may be multiple instances of these two entities. For example, there may be thousands or millions of client devices 120 in communication with several or many web editing servers 110.

The web editing server 110 stores web pages created by users and provides templates for new web pages. As used herein, a web page is a data item that can be rendered to generate a page of content with one or more visual elements. Examples of visual elements include images, videos, headings, and body text. In some embodiments, some elements of a web page may contain other elements. For example, a column element may contain body text or image elements. Web pages can also include interactive visual elements that change appearance automatically or in response to a user interaction within the visual element. For example, a web page may include a slideshow element that displays a series of predetermined images. The slideshow may switch to a different image after a certain time interval has elapsed or in response to a user input. As another example, a web page may include a map element that presents an interactive map with interactive zooming and panning functions.

In some embodiments, the web editing server 110 is implemented as a single server, while in other embodiments it is implemented as a distributed system of multiple servers. The web editing server 110 includes a web page store 112, web page templates 114, and a request fulfillment module 116.

The web page store 112 includes a plurality of web pages created by users of the web editing server 110. Each web page in the web page store 112 includes instructions that define the size, position, and content of visual elements on the page. In one embodiment, the instructions are stored as structured data (e.g., JSON data) that can be used to assemble markup language (e.g., HTML) describing the page. In this embodiment, the structured data may include portions of markup language. In another embodiment, the instructions are stored in a markup language and not as structured data. The content of a visual element can either be included as part of the instructions for the corresponding web page or stored as separate data items that are referenced in the instructions for the web page. For example, body text and headings on the web page are included as part of the instructions, but images on the web page are stored as separate files and instructions include references to those files. Separate data items can be stored alongside the web pages in the web page store 112 or on a separate server that is accessible via the network 101.

The web pages in the web page store 112 can be organized into websites. A website includes one or more individual web pages that are connected to each other (e.g., with hyperlinks). In addition to the individual web pages, a website can also include a page hierarchy and theme content.

A page hierarchy describes relationships between different pages of the website. For example, the page hierarchy may organize the website into a tree structure with the home page at the root, pages for the main sections of the website as branches connected to the root, and pages representing sub-sections as leaves connected to each branch.

Theme content is data that defines visual characteristics of one or more web pages. In one embodiment, theme content is written in Cascading Style Sheets (CSS). For example, the theme content defines formatting settings such as the size, font, and color of text, hyperlinks, and headings, the color and size of borders, and the sizes of margins. The theme content may also define layout settings such as the position of a main heading on each page and the position of hyperlinks for navigating to other sections of the website. It is advantageous to store a single item of theme content for a website rather than a separate item of theme content for each web page because web pages in a website typically have the same layout, formatting, and other visual characteristics.

The web page templates 114 are data items that can be used to create new web pages and websites. Each template 114 includes theme content, as described above. In addition to theme content, a template 114 may also include other content for defining the appearance of the web page, such as custom typefaces or graphics. A template 114 may additionally include sample images and text (e.g., lorem ipsum text) to provide a user with a representation of how the web page will appear after the user's content is added.

The request fulfillment module 116 receives and processes requests from client devices 120 to retrieve templates 114 and web pages. For example, the module 116 receives requests from client devices 120 to load a web page for a user of the client device 120 to edit and provides the requested web page to the client device 120. After users make edits to the web page, the module 116 also receives and fulfills requests to update that web page in the web page store 112 to incorporate the user's edits.

The client device 120 is a computing device that allows a user to interact with the web editing server 110 to create and edit web pages. For example, the client device 120 may be a mobile device such as a tablet computer or a smart phone. The client device 120 may alternatively be a laptop or desktop computer. As shown in FIG. 1, the client device 120 executes an operating system 122 and a web editing application 126.

Figure 7:
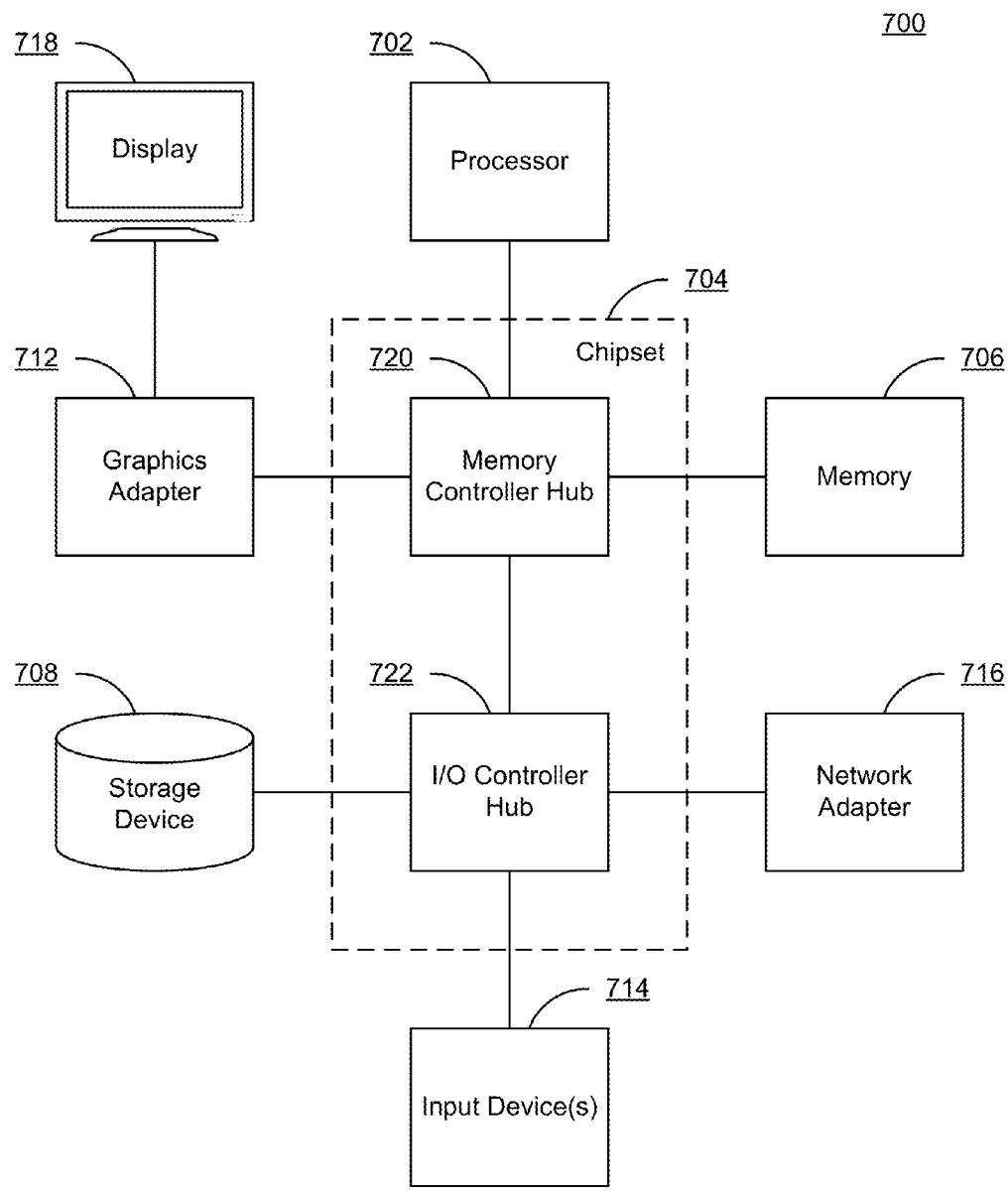
FIG. 7 is a high-level block diagram of the components of a computing system for use, for example, as the web editing server or the client device shown in FIG. 1, in accordance with an embodiment.

The operating system 122 provides modules that allow applications on the client device 120 (e.g., the web editing application 126) to interact with hardware components of the client device 120, such as the hardware components described in FIG. 7. One of these modules is the web rendering module 124, which receives instructions for rendering a web page (e.g., in JSON or HTML) and executes the instructions to render a visual representation of the web page. As described above with reference to the web editing server 110, a rendered web page includes one or more visual elements, such as images, videos, body text, and headings. The web rendering module 124 can also contain components that interpret structured data (e.g., JSON) to assemble markup language (e.g., HTML) and generate layout data (data describing the position and size of each visual element on a rendered web page) based on a rendered web page. The layout data can subsequently be provided to other components of the client device 110, such as the web editing application 126. In one embodiment, the operating system 122 is APPLE IOS and the web rendering module 124 is the UIWebView class. In another embodiment, the operating system 122 is GOOGLE ANDROID and the web rendering module 124 is the WebView class. An embodiment of the web rendering module 124 is described in detail with reference to FIG. 2B.

The web editing application 126 retrieves web pages and templates 114 from the web editing server 110 (e.g., via the request fulfillment module 116) and operates in conjunction with the web rendering module 124 to provide an interface that allows a user to edit the web pages. The interface includes a native overlay that is generated based on the layout data provided by the web rendering module 124. The process of generating the native overlay and making edits to web pages via the native overlay is described in detail with reference to FIGS. 2A, 3, 4A, 5A, and 6A. After the user makes one or more edits to a web page, the web editing application 126 also sends edited web pages back to the web editing server 110 to be stored in the web page store 112.

The network 101 provides a communication infrastructure between the web editing server 110 and the client device 120. The network 101 is typically the Internet, but may be any networking, including but not limited to a Local Area Network (LAN), a Metropolitan Area Network (MAN), a Wide Area Network (WAN), a mobile wired or wireless network, a private network, or a virtual private network.

Figure 2A:
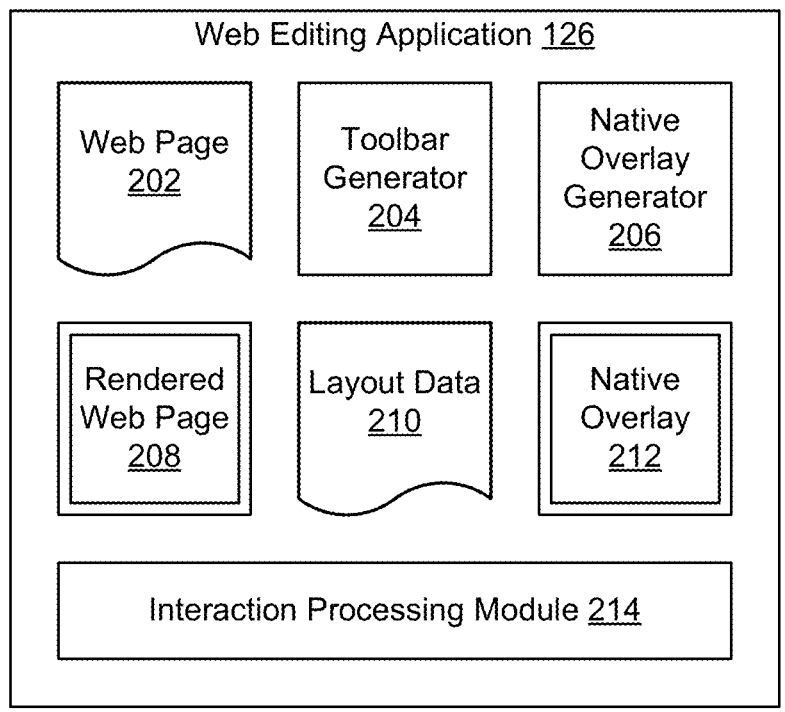
FIG. 2A is a block diagram illustrating components of the web editing application shown in FIG. 1, in accordance with an embodiment.

FIG. 2A is a block diagram illustrating components of the web editing application 126 shown in FIG. 1, in accordance with an embodiment. The web editing application 126 includes a web page 202, a toolbar generator 204, a native overlay generator 206, a rendered web page 208, layout data 210, a native overlay 212, and an interaction processing module 214. In other embodiments, the web editing application 126 may include additional or fewer components, and the functionality of the web editing application 126 may be distributed among its components in a different manner.

The web page 202 is a local copy of a web page in the web page store 112. As described above with reference to the web editing server 110, the web page 202 includes instructions (e.g., stored as structured data, such as JSON, that may include portions of markup language in HTML) that can be executed to render the web page, and the instructions define the size, position, and content of the visual elements on the rendered web page 208. Although only one web page 202 is shown in FIG. 2A, the web editing application 126 may store multiple web pages at once. Storing multiple web pages advantageously allows the user to rapidly switch from one web page to another web page without waiting for the web editing application 126 to retrieve the other web page from the web editing server 110. The web editing application 126 may also store theme content and a page hierarchy associated with the web page 202. In one embodiment, the web editing application 126 stores the web pages, theme content, and page hierarchy for an entire website. The web editing application 126 may alternatively store a subset of the pages in a website or subsets of pages from multiple websites.

The toolbar generator 204 provides one or more visual toolbars containing options that allow the user to edit the web page. Some of the toolbars include options to add visual elements to the page. For example, a toolbar may include options to add a paragraph of text, a map, an image, or a slideshow. The toolbars may also provide options to change visual characteristics of the pages, such as the background color of the page or the size, color, and font of body text and headings on the page. These changes can be stored as part of the web page (e.g., if they are specific to the page) or as part of the theme content (e.g., if they affect multiple web pages that are associated with the same item of theme content). In addition to toolbars, the toolbar generator 204 may also present provide other interface elements, such as menus and status bars.

The native overlay generator 206 sends the web page 202 to the web rendering module 124, which causes the web rendering module 124 to render and display a visual representation of the web page 202. The visual representation of the web page 202 is referred to herein as the rendered web page 208. The process of rendering and displaying a rendered web page 208 is described in further detail below with reference to the structured data interpreter 252 and the web rendering engine 254 in FIG. 2B. The web rendering module 124 also generates and returns layout data 210 about the rendered web page 208. The process of generating the layout data 210 is described in further detail below with reference to the layout data generator 256 in FIG. 2B.

As described above with reference to the web rendering module 124, the layout data 210 describes the position and size of visual elements on the rendered web page 208. For example, the layout data 210 includes a set of x and y coordinates describing the position of the upper-left corner of each visual element and a set of x and y dimensions describing the size of each visual element. In some embodiments, the layout data 210 stores the position and size of each visual element in association with an identifier that uniquely identifies the visual element.

After receiving the layout data 210, the native overlay generator 206 causes the client device 120 to generate a native overlay 212. The native overlay 212 includes an arrangement of one or more cells, and each cell has a position and size that matches a respective visual element of the rendered web page 208. In one embodiment, the native overlay generator 206 interacts with a layout generation module in the operating system 122 to generate the native overlay 212. For example, if the operating system 122 is APPLE IOS, the native overlay generator 206 creates an instance of the UICollectionView class to generate the native overlay 212. As another example, if the operating system 122 is GOOGLE ANDROID, the native overlay generator 206 creates an instance of the ViewGroup class. In this embodiment, the layout generation module is configured to receive instructions that define the position and size of each cell. To prepare these instructions, the native overlay generator 206 may perform a transformation on the layout data 210 received from the web rendering module 124. For example, if the layout data 210 defines the upper left corner of each cell but the layout generation module is configured to receive instructions that define the center of each cell, then the native overlay generator 206 performs a transformation to convert the coordinates for each cell's upper left corner to coordinates for each cell's center. Alternatively, the native overlay generator 206 may use the unmodified layout data 210 as the instructions.

In one embodiment, each cell in the native overlay 212 is transparent, and the native overlay generator 206 causes the native overlay 212 to be displayed on top of the rendered web page 208. As a result, the rendered web page 208 remains visible under the native overlay 212, but the native overlay 212 captures any gestures or other interactions that the user performs on the screen.

The interaction processing module 214 receives user interactions with the toolbars and the native overlay 212 and makes corresponding changes to the web page 202. After receiving a user interaction, the interaction processing module 214 updates the web page 202 and passes the updated web page 202 to the web rendering module 124 to be rendered. In addition to rendering and displaying the updated web page 202 to the user, the web rendering module 124 also generates and returns updated layout data 210 to the native overlay generator 206, and the native overlay generator 206 regenerates the native overlay 212. The interaction processing module 214 can also send the updated web page 202 to the server 110 to be saved in the web page store 112.

User interactions that change the layout of the web page 202 can include, for example, moving a visual element, adding a new visual element from a toolbar, editing an existing visual element (e.g., by resizing the visual element), or deleting an existing visual element. These example interactions are described in further detail with reference to FIGS. 4A, 5A, and 6A.

Figure 2B:
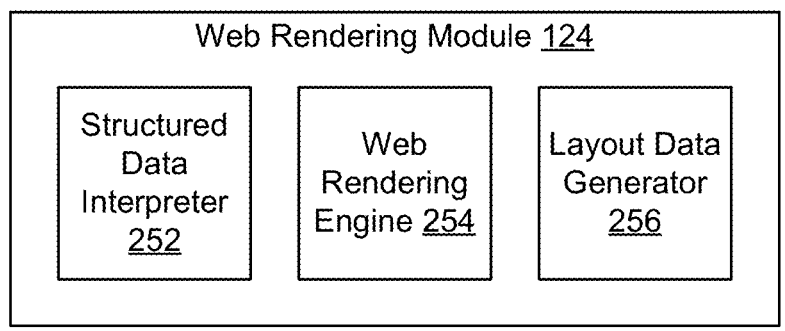
FIG. 2B is a block diagram illustrating components of the web rendering module shown in FIG. 1, in accordance with an embodiment.

FIG. 2B is a block diagram illustrating components of the web rendering module 124 shown in FIG. 1, in accordance with an embodiment. The web editing application 124 includes a structured data interpreter 252, a web rendering engine 254, and a layout data generator 256. In other embodiments, the web rendering module 124 may include additional or fewer components, and the functionality of the web editing application 126 may be distributed among its components in a different manner.

In embodiments where the web page 202 is stored in the web editing application 126 as structured data (e.g., JSON), the structured data interpreter 252 interprets the structured data to assemble markup language describing the web page (e.g., HTML). In one embodiment, the structured data interpreter 252 is provided by the same developer as the web editing application 126. For example, the developer that provides the web editing application 126 also provides JavaScript code (which can be executed by the web rendering module 124) that implements the structured data interpreter 252.

The web rendering engine 254 is a layout engine that receives markup language (e.g., HTML) describing a web page and generates a rendered web page 208. In embodiments where the web page 202 is stored in the web editing application 126 as structured data, the web rendering engine 254 receives markup language from the structured data interpreter 252. The web rendering engine 254 may alternatively receive markup language directly from the web editing application (e.g., if the web page 202 is stored as markup language). Unlike the structured data interpreter 252, which may be provided by the same developer as the web editing application 126, the web rendering engine 254 is typically provided as part of the operating system 122. For example, the web rendering engine 254 is the WebKit layout engine that is included as part of APPLE IOS.

The layout data generator 256 generates the layout data 210 by querying the web rendering engine 254 for information describing the position and size of each visual element on the rendered web page 208. In one embodiment, the layout data generator 256 arranges the position and size information into a structured format (e.g., JSON) and provides the layout data 210 in this structured format. When generating the layout data 210, the layout data generator 256 may also associate each item of position and size information with an identifier for the corresponding visual element. Similar to the structured data interpreter, the layout data generator 256 may also be provided by the same developer as the web editing application 126. For example, the developer provides JavaScript code that can be executed by the web rendering module 124 to perform the functions of the layout data generator 256. In one embodiment, a single module of JavaScript code implements both the structured data interpreter 252 and the layout data generator 256.

Example Method

Figure 3A:
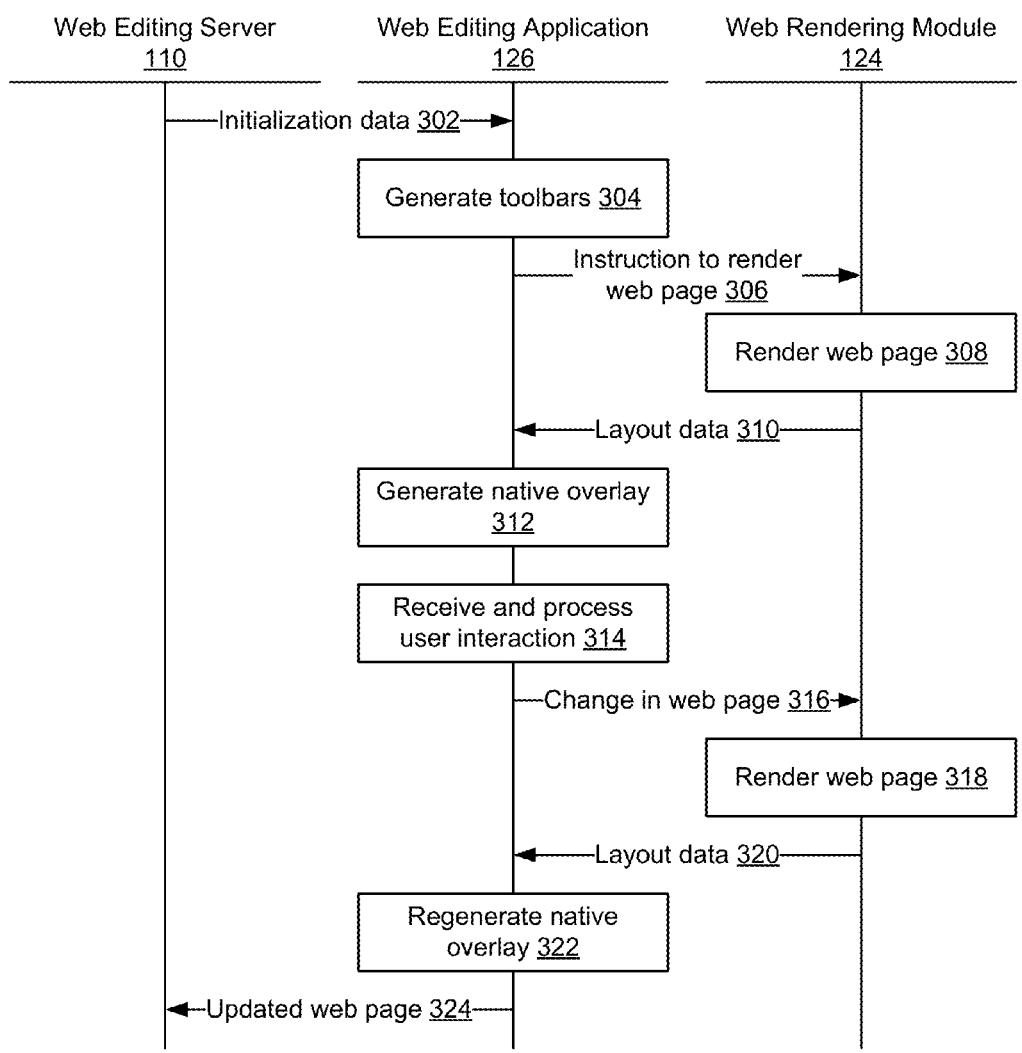
FIG. 3A is a flow chart illustrating a method of editing web content, in accordance with an embodiment.
Figure 3B:
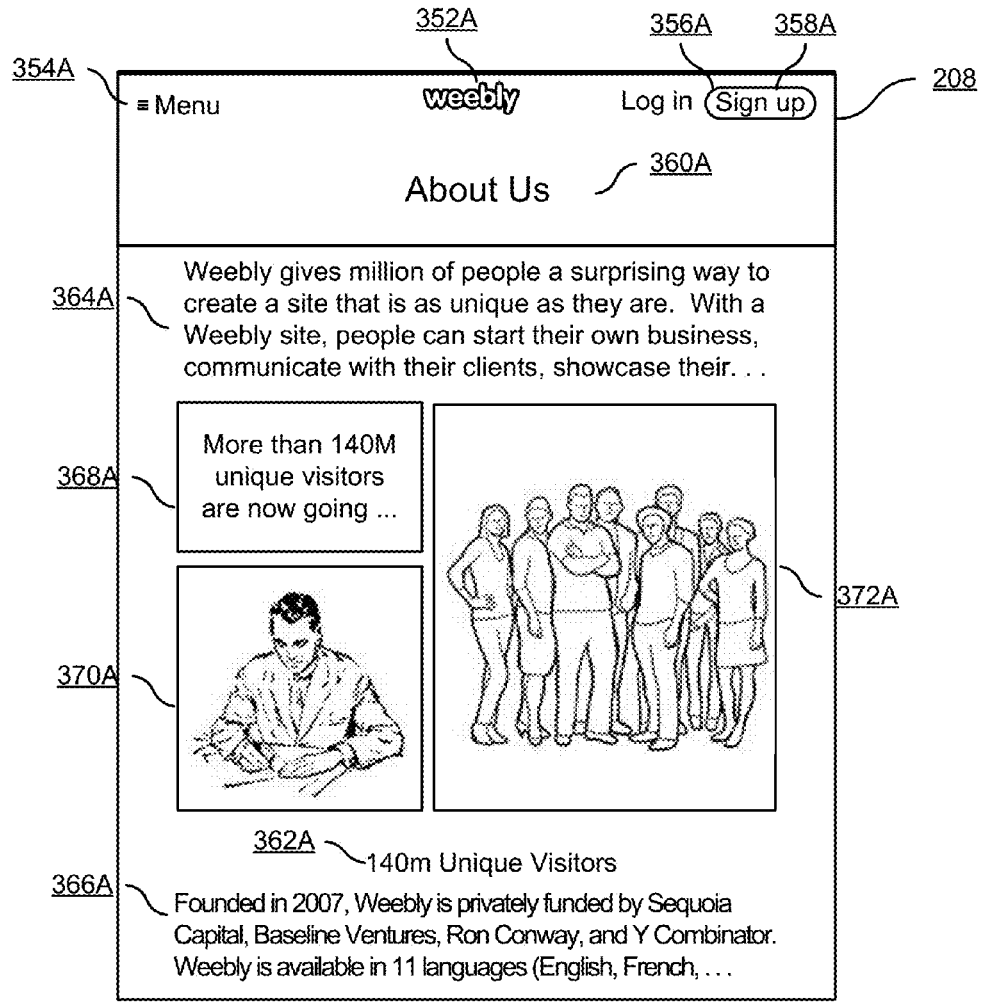
FIGS. 3B-3D illustrate an example of a rendered web page and a corresponding native overlay, in accordance with an embodiment.
Figure 3C:
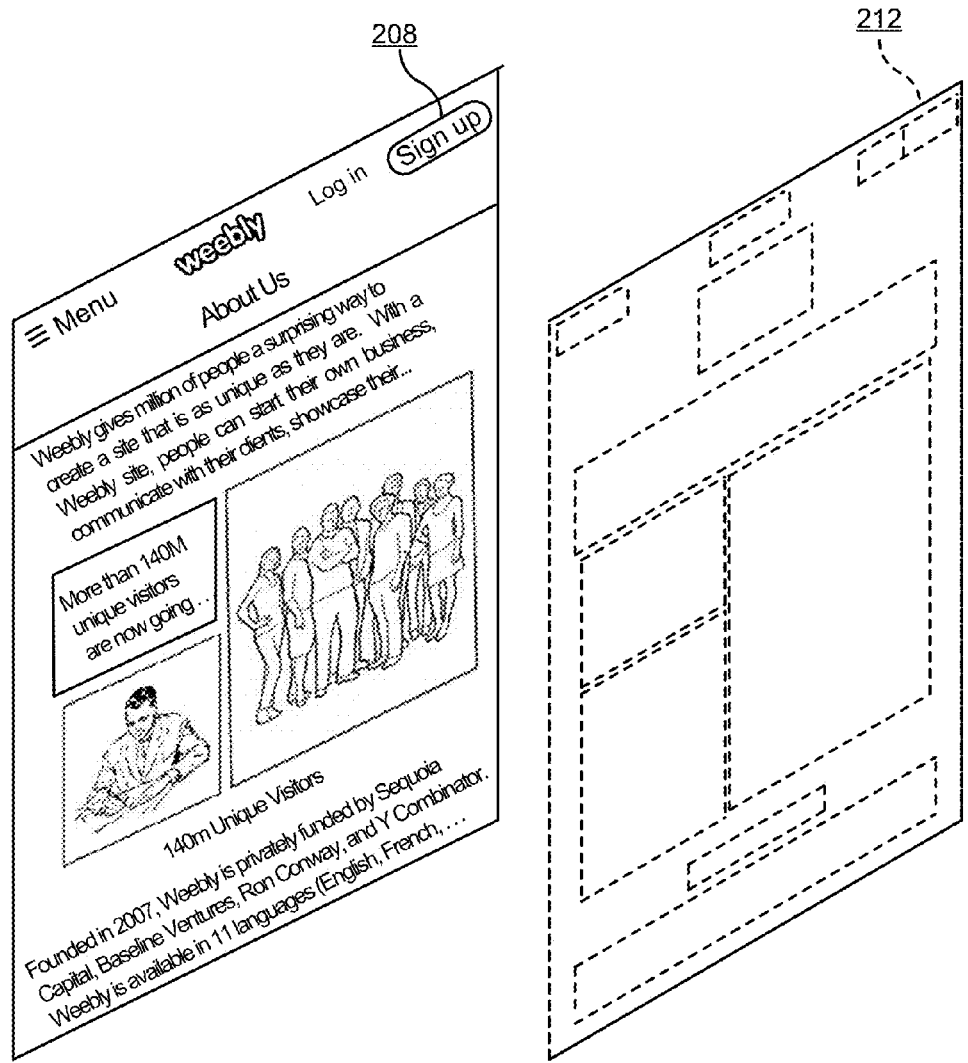
Figure 3D:
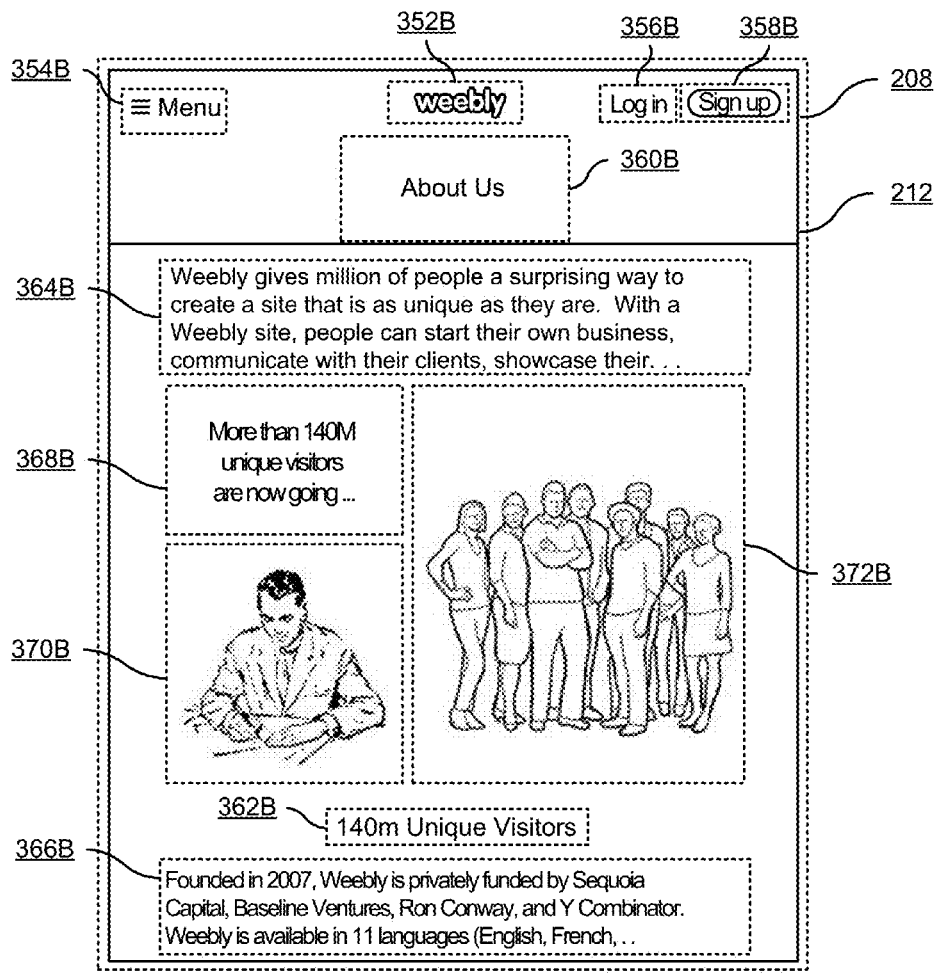

FIG. 3A is a flow chart illustrating a method 300 of editing web content, in accordance with an embodiment. Other embodiments may perform the steps of the method in different orders or may perform additional or fewer steps. FIGS. 3B-3D illustrate an example of a rendered web page 208 and a corresponding native overlay 212, in accordance with an embodiment. For ease of discussion, the method 300 illustrated in FIG. 3A will be described below in conjunction with the example rendered web page 208 and native overlay 212 shown in FIGS. 3B-3D.

When the user begins editing web content using the web editing application 126, the web editing application 126 sends a request for the web content to the web editing server 110. The requested web content may include a template 114 (if the user wishes to create a new web page) or a web page from the web page store 112 (if the user wishes to edit an existing web page). As described above with reference to FIG. 1, a web page is any data item that can be rendered to generate a page of content with one or more visual elements. The web page may include structured data (e.g., JSON), markup language (e.g., HTML), or some combination of the two. The web editing application 126 may also request multiple web pages and templates 114 at once. For example, the application 126 may request every page of a web site and templates 114 for creating pages with a similar formatting and layout as the existing pages of the website.

In response to the request, web editing server 110 sends 302 initialization data to the web editing application 126. The initialization data includes the requested web page(s) or template(s) 114, which is stored as web page(s) 202 in the web editing application 126. The initialization data also includes the theme content and a page hierarchy associated with the requested web page(s) or template(s) 114. The theme content and page hierarchy may be stored in association with the web page(s) 202 in the web editing application 126.

In addition to requesting the web content, the web editing application 126 also generates 304 toolbars containing options that allow the user to edit the web page 202. Although the step of generating 304 the toolbars is illustrated in FIG. 3 as occurring after the web editing application 126 receives 302 the initialization data, these two steps 302, 304 are independent. Therefore, web editing application 126 may alternatively generate 304 the toolbars before requesting and receiving 302 the initialization data, or the two steps 302, 304 may be performed concurrently.

After receiving 302 the initialization data, the web editing application 126 sends 306 an instruction to the web rendering module 124 to render the web page 202. In response, the web rendering module 124 renders 308 the web page 202 and displays the rendered web page 208 on the client device 120. In an embodiment where the web page 202 is stored as structured data (e.g., JSON), the structured data interpreter 252 transforms the structured data into markup language (e.g., HTML) describing the rendered web page 208, and the web rendering module 254 uses the markup language to generate and display the rendered web page 208. An example rendered web page 208 is shown in FIG. 3B. The example rendered web page 208 includes a plurality of visual elements 352A through 372A. In the illustrated example, the visual elements include a logo 352A, links to access a menu 354A, log in 356A, and sign up 358A, a main heading 360A, a sub-heading 362A, body text 364A, 366A, and images 368A, 370A, 372A.

Referring back to FIG. 3A, the web rendering module 124 also generates and sends 310 layout data 210 back to the web editing application 126. As described above, the layout data 210 describes the sizes and positions of the visual elements 352A through 372A on the rendered web page 208. For example, the layout data 210 may define the position of the upper-left corner, the horizontal dimension, and the vertical dimension of each visual element 352A through 372A.

The web editing application 126 uses the layout data 210 to generate 312 a native overlay 212. FIGS. 3C and 3D illustrate an example native overlay 212 for the rendered web page 208 shown in FIG. 3B. FIG. 3C is an exploded view that illustrates the native overlay 212 and the rendered web page 208 separately, and FIG. 3D illustrates the native overlay 212 displayed on top of the rendered web page 208. Although the visual elements 352A through 372A of the rendered web page 208 are shown in FIG. 2D, reference numerals for the visual elements are not shown in FIG. 2D for the sake of clarity. The native overlay 212 shown in FIGS. 3C and 3D includes a plurality of cells 352B through 372B, and each cell 352B through 372B has a position and size that matches the position and size of a respective visual element 352A through 372A on the rendered web page 208.

In one embodiment, the web editing application 126 configures the native overlay 212 so that each cell 352B through 372B is transparent, and the web editing application 126 causes the native overlay 212 to be displayed on top of the rendered web page 208. As a result, the rendered web page 208 remains visible to the user under the native overlay 212, but each visual element 352A through 372A on the rendered web page 208 is aligned with a cell 352B through 372B on the native overlay 212. FIG. 3D illustrates an example of how the cells 352B through 372B align with the visual elements 352A through 372A in this manner.

Because the native overlay 212 is displayed on top of the rendered web page 208, the native overlay 212 captures any gestures or other interactions that the user performs. Thus, when the user attempts to interact with a visual element on the rendered web page 208, the user actually performs an interaction with a cell in the native overlay 212 that has the same position and size as the visual element.

Referring back to FIG. 3A, in one embodiment the web editing application 126 sends instructions to a layout generation module in the operating system 122 (e.g., by creating an instance of the UICollectionView class in APPLE IOS) to generate 312 and display the native overlay 212 on the client device 120. For example, the instructions may define the position and size of each cell 352B through 372B in the native overlay 212 and an indication that each cell 352B through 372B is transparent.

The web editing application 126 receives 314 a user interaction with the native overlay 212 or one of the toolbars and makes a corresponding change to the web page 202. Examples of user interactions and the corresponding changes are described below with reference to FIGS. 4A, 5A, and 6A. The web editing application 126 sends 316 the change to the web rendering module 124, and the web rendering module 124 renders 318 the updated rendered web page 208 for display on the client device 120. The web rendering module 124 also sends 320 updated layout data 210 for the updated rendered web page 208 back to the web editing application 126.

After receiving the updated layout data 210, the web editing application regenerates 322 the native overlay 212 using the updated layout data 210 so that the cells of the native overlay 212 match the visual elements of the updated rendered web page 208. In one embodiment, the web editing application 126 first compares the updated layout data 210 to the previous layout data and only regenerates 322 the native overlay if the updated layout data 210 is different (i.e., if the updated layout data indicates that the user interaction changed the layout of the rendered web page 208). In another embodiment, the web editing application 126 regenerates 322 the native overlay 212 using the updated layout data 210 without first comparing the updated layout data 210 to the previous layout data.

At any point after the web editing application 126 updates the web page 202 based on the user's interaction, the web editing application 126 may send 324 the updated web page 202 to the request fulfillment module 116 of the web editing server 110 to be saved in the web page store 112. This step 324 may be performed automatically without receiving a separate user input to save the web page 202 to the web page store 112. In one embodiment, the web editing application 126 implements a queuing system to send multiple updates to the request fulfillment module 116 in series after the updates are made on the client device 120. A queuing system can be advantageous in situations where the client device 120 does not have continuous access to the web editing server 110 over the network 101 and might not be able to save each edit immediately after the edit is made.

Method for Moving a Visual Element

Figure 4A:
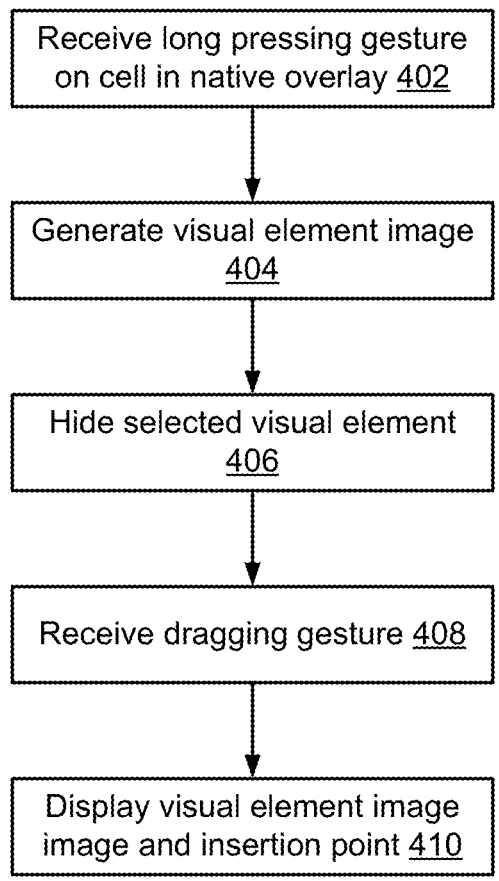
FIG. 4A is a flow chart illustrating a method of interacting with a native overlay to move a visual element on a web page, in accordance with an embodiment.
Figure 4B:
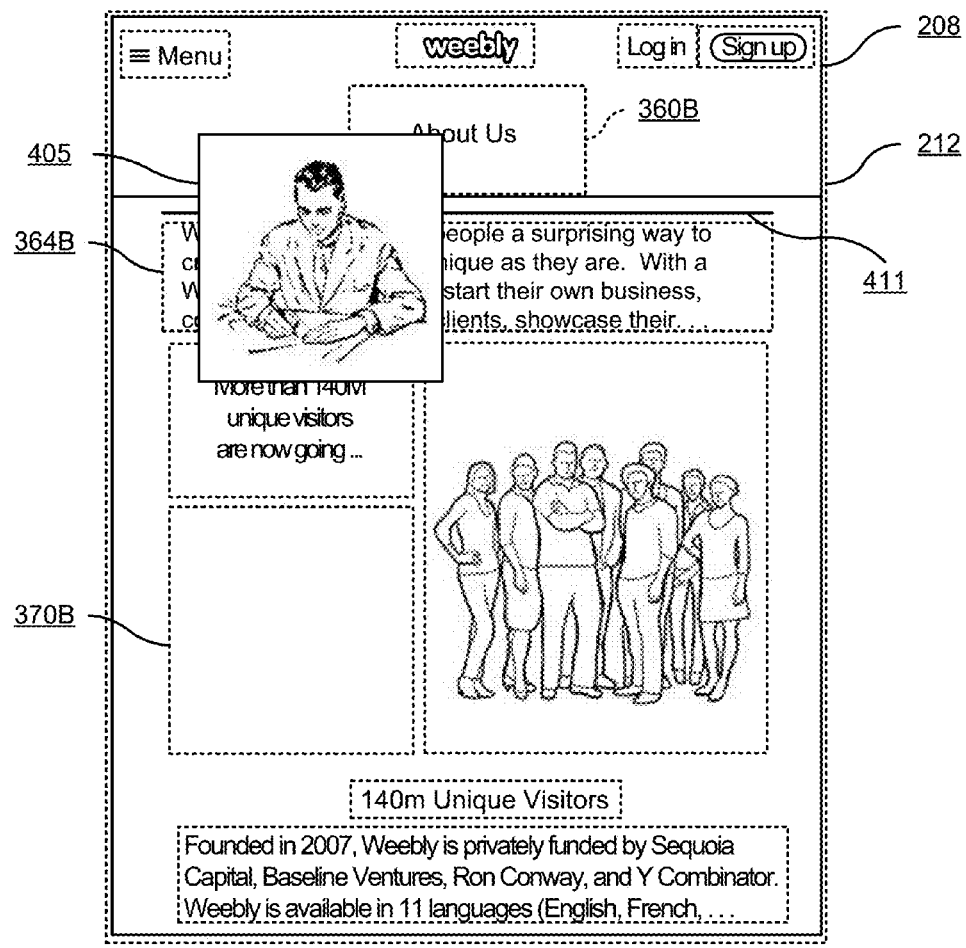
FIG. 4B illustrates an example of a visual element being moved, in accordance with an embodiment.

FIG. 4A is a flow chart illustrating a method 314A of interacting with a native overlay 212 to move a visual element on a web page, in accordance with an embodiment. Other embodiments may perform the steps of the method 314A in different orders or may perform additional or fewer steps. FIG. 4B illustrates an example of a visual element being moved, in accordance with an embodiment. For the sake of clarity, reference numerals for the visual elements 352A through 372A of the rendered web page 208 are not shown in FIG. 4B. Similarly, reference numerals for the cells that are not explicitly referenced in the description below (i.e., cells 352B through 358B, 362B, 366B, 368B, and 372B) also are not shown in FIG. 4B. For ease of discussion, the method 314A of FIG. 4A will be described in conjunction with the example illustrated in FIG. 4B.

The method 314A begins when the user performs a long pressing gesture on a visual element within the rendered web page 208. Because the native overlay 212 is displayed on top of the rendered web page 208, the interaction processing module 214 receives 402 the long pressing gesture on the corresponding cell in the native overlay 212. For example, if the user performs a long pressing gesture on the image element 370A shown in FIG. 3B, the interaction processing module 214 receives a long pressing gesture on the corresponding cell 366B shown in FIGS. 3D and 4B. In one embodiment, the interaction processing module 214 receives an identifier for the cell that was pressed. In another embodiment, the interaction processing module 214 receives an indication that a long pressing gesture was detected at a particular position on the display and uses the layout data 210 to identify the cell that was pressed.

The interaction processing module 214 uses the layout data 210 to generate 404 an image of the selected visual element (the visual element image). In one embodiment, the interaction processing module 214 accesses the layout data 210 to obtain the position and dimensions of the cell corresponding to the selected visual element and captures a screenshot of the region of the rendered web page 208 defined by the position and dimensions. In another embodiment, the interaction processing module 214 captures a screenshot image of the entire rendered web page 208 and uses the layout data 210 to crop the screenshot image to remove everything other than the visual element. For example, if the layout data 210 defines the top-left corner and the dimensions of the visual element, the interaction processing module 214 uses these two data items to determine the four corners of the visual element and crops the screenshot image to remove portions of the screenshot image that does not fall within those four corners.

The interaction processing module 214 also hides 406 the visual element so that the visual element is not displayed twice on the screen when the user performs a dragging gesture. In one embodiment, the interaction processing module 214 modifies the selected cell (which was previously transparent) so that the cell has an opaque color that matches the background color of the rendered web page 208. In the example shown in FIG. 4B, the cell 370B is modified in this manner to match the white background of the rendered web page 208. Alternatively, the module 214 may change the color of the selected cell to a default color (e.g., grey) or apply a pattern to the selected cell (e.g., grey stripes). The module 214 may also modify the appearance of the visual element image to add another visual cue that the visual element is being moved. For example, the module 214 may adjust the opacity of the visual element image.

To move the visual element, the user performs a dragging gesture to drag the visual element image from its initial position (i.e., a position within the selected cell) to a new position on the rendered web page 208. When the interaction processing module 214 receives 408 the dragging gesture, the module 214 displays 410 the visual element image at the new position. In one embodiment, the module 214 implements the display of the visual element image as a draggable image so that the visual element image appears to move with the user's finger as the user performs the dragging gesture. In the example shown in FIG. 4B, the user has performed a dragging gesture to drag the visual element image 405 from a position within the cell 370B to a position near the top of the rendered web page 208. As a result, the interaction processing module 214 displays the visual element image 405 near the top of the page 208.

The interaction processing module 214 also displays 410 an insertion point (e.g., the insertion point 411 in FIG. 4B). The insertion point represents the location at which the visual element will be inserted if the user terminates the dragging gesture (e.g., by lifting his or her finger) at the current position of the gesture. In one embodiment, the insertion point is a line that is drawn at the edge of a cell on the native overlay 212. In this embodiment, the interaction processing module 214 accesses the layout data 210 to determine the edge that is closest to the current position of the dragging gesture and displays the insertion point at the edge. In another embodiment, the insertion point is a line that is offset from the edge of a cell by a predetermined offset distance. Because the cells in the native overlay 212 align with the visual elements on the rendered web page 208, an insertion point that is displayed at or near the edge of a cell looks like it is displayed at the edge of a visual element. This has the effect of communicating the new location of the visual element being moved relative to the location of another visual element on the rendered web page 208. For example, the insertion point 413 in FIG. 4B is displayed near the top edge of the cell 364B corresponding to the body text element 364A, which indicates that the image element shown in the visual element image 407 will be placed in a location above the body text element 364A and below the main heading 260A (i.e., the element corresponding to the cell 360B).

When the user terminates the dragging gesture, the interaction processing module 214 moves the visual element to a location on the web page 202 corresponding to the insertion point. For example, the interaction processing module 214 changes the web page 202 so that the visual element is displayed in the new location when the web page 202 is rendered. The interaction processing module 214 also sends 316 the change in the web page 202 to the web rendering module 124 in accordance with the method 300 described in FIG. 3.

Method for Editing a Visual Element

Figure 5A:
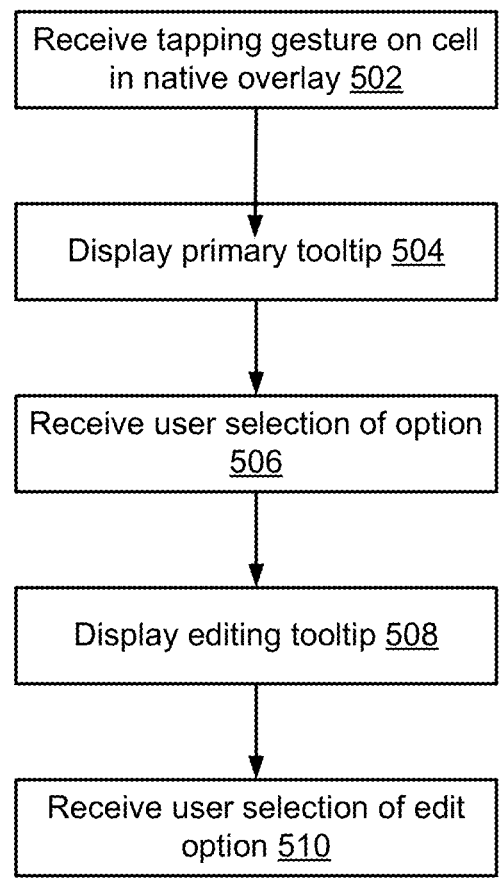
FIG. 5A is a flow chart illustrating a method of interacting with a native overlay to edit a visual element on a web page, in accordance with an embodiment.
Figure 5B:
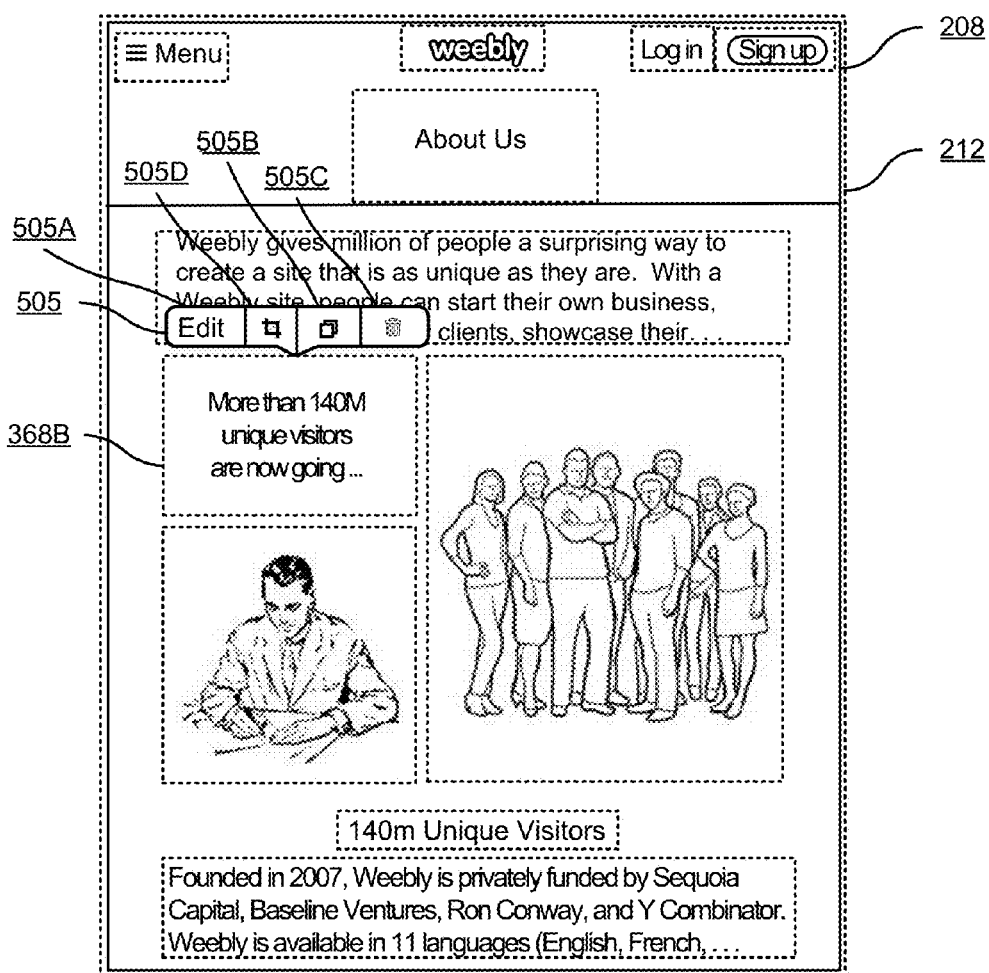
FIGS. 5B-5C illustrate an example of a visual element being edited, in accordance with an embodiment.
Figure 5C:
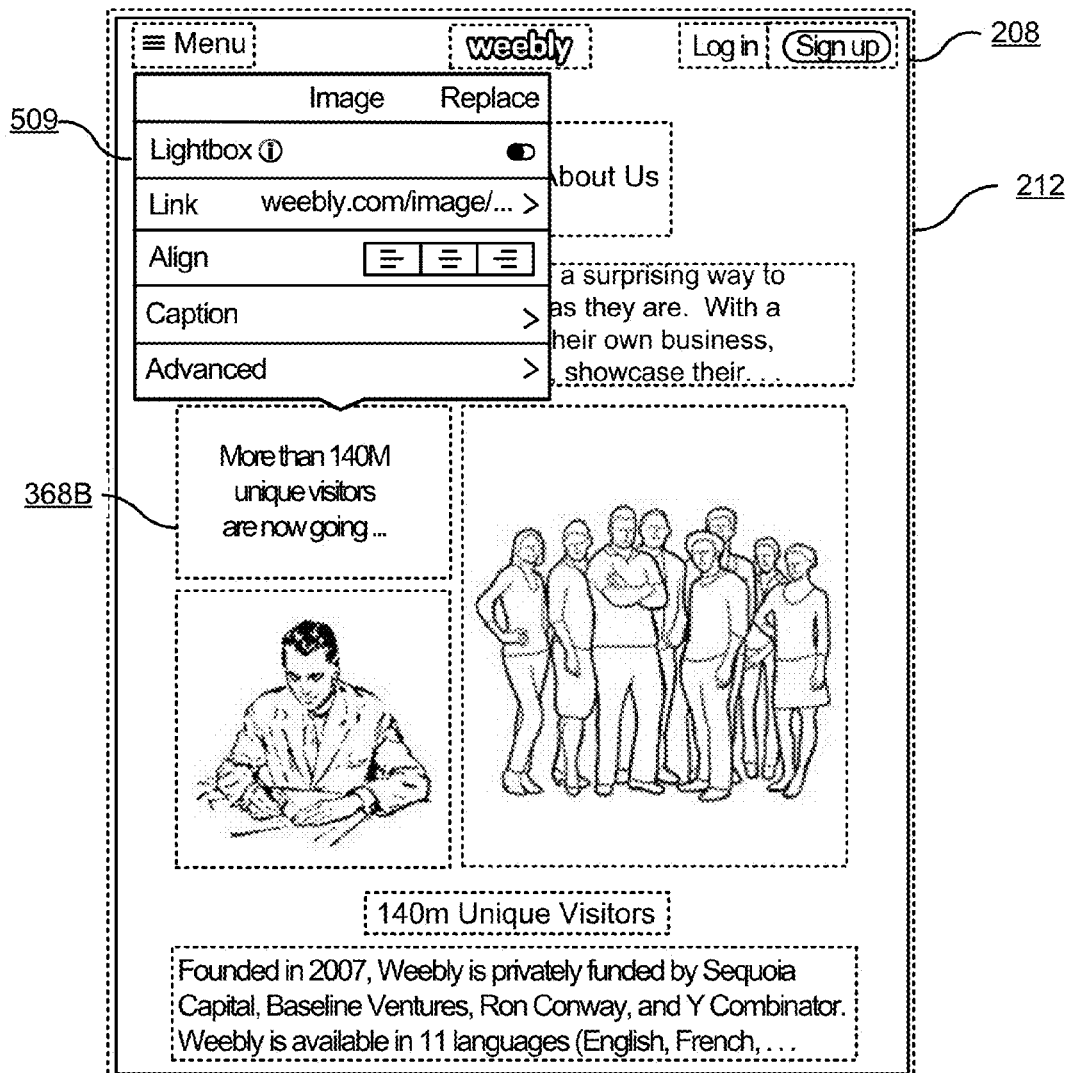

FIG. 5A is a flow chart illustrating a method 314B of interacting with a cell in the native overlay 212 to edit a visual element on a web page, in accordance with an embodiment. Other embodiments may perform the steps of the method 314B in different orders or may perform additional or fewer steps. FIGS. 5B-5C illustrate an example of a visual element being edited, in accordance with an embodiment. For the sake of clarity, reference numerals for the visual elements 352A through 372A of the rendered web page 208 are not shown in FIGS. 5B-5C. Similarly, reference numerals for the cells that are not explicitly referenced in the description below (i.e., cells 352B through 366B, 370B, and 372B) also are not shown in FIGS. 5B-5C. For ease of discussion, the method 314B of FIG. 5A will be described in conjunction with the example illustrated in FIGS. 5B-5C.

The method 314B begins when the user performs a tapping gesture on a visual element on the rendered web page 208. After the interaction processing module 214 receives 422 the tapping gesture on the corresponding cell in the native overlay 212, the module identifies the visual element by accessing the layout data 210. In the example shown in FIG. 5B, the user has performed a tapping gesture on the image element 368A. As a result, the interaction processing module 214 received 422 the tapping gesture on the cell 368B.

The interaction processing module 214 displays 424 a primary tooltip proximate to the cell. In one embodiment, the primary tooltip includes options to edit, move, and delete the visual element. An example of a primary tooltip 505 with these options 505A, 505B, 505C is illustrated in FIG. 5B. In some embodiments, the primary tooltip includes additional options that are only displayed for certain types of visual elements. For example, if the visual element is an image (as shown FIG. 5B) the primary tooltip may include an option 606D to crop the image. In one embodiment, the primary tooltip is displayed 424 inside the cell (and on top of the visual element). In another embodiment, the primary tooltip is displayed 424 at a position near the cell. For example, the primary tooltip may be displayed at a position above the cell (as shown in FIG. 5B) to prevent the tooltip from overlapping any portion of the visual element.

The user selects one of the options on the primary tooltip and the interaction processing module 214 receives 426 the user selection. If the user selects the delete option 505C, the module 214 changes the web page 202 to delete the visual element and the method 314C terminates. If the user selects the move option 505B, the module 214 performs steps 404 through 412 of the method 314A described with reference to FIG. 4A.

If the user selects the edit option 505A, the interaction processing module 214 displays 428 an editing tooltip that includes one or more options for making edits to the visual element. An editing tooltip 509 for the image element 368A is illustrated in FIG. 5C. The interaction processing module 214 determines the element type of the visual element being edited and selects the editing options in the editing tooltip 509 based on the element type. In one embodiment, the interaction processing module 214 determines the element type based on an identifier for the element that is associated with the cell or with the item of layout data corresponding to the cell. For example, if the module 214 determines that the visual element is an image, the edit options may include options to add a caption to the image and to provide a URL that opens when the image is selected (as shown in FIG. 5C). Meanwhile, if the visual element is a map, the edit options may include options to provide an address that is marked on the map and a default zoom level for the map. When the user selects one of the edit options, the interaction processing module 214 receives 430 the user selection and makes a corresponding change to the web page 202.

Method for Adding a Visual Element

Figure 6A:
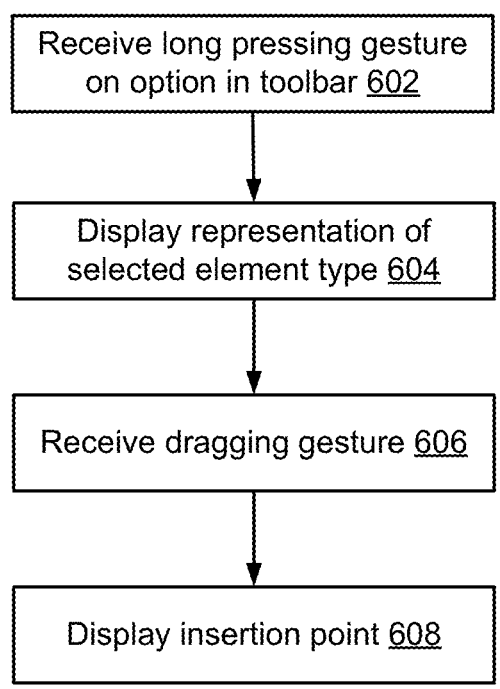
FIG. 6A is a flow chart illustrating a method of interacting with a native overlay to add a new visual element to a web page, in accordance with an embodiment.
Figure 6B:
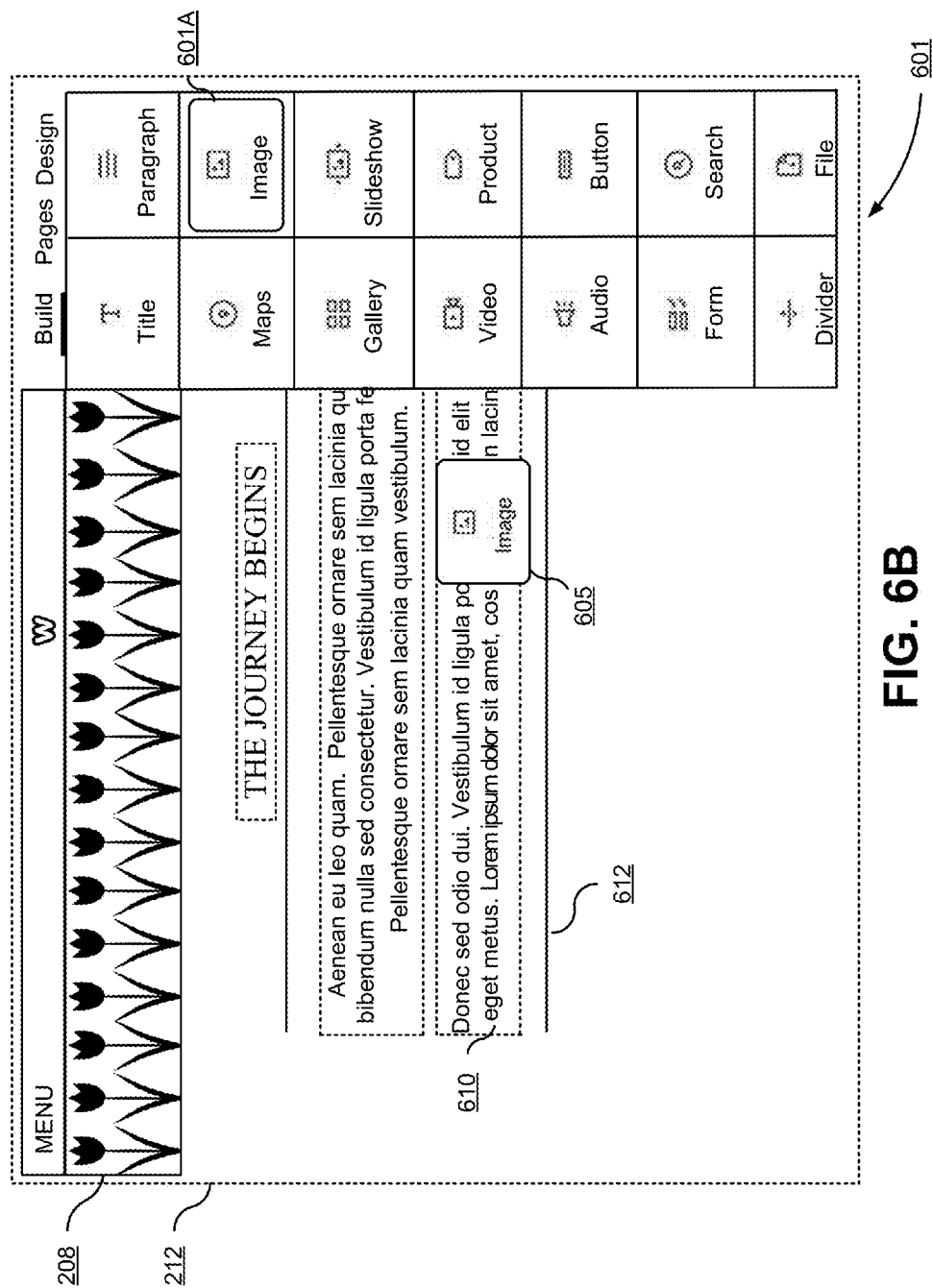
FIGS. 6B-6C illustrate an example of a visual element being added, in accordance with an embodiment.
Figure 6C:
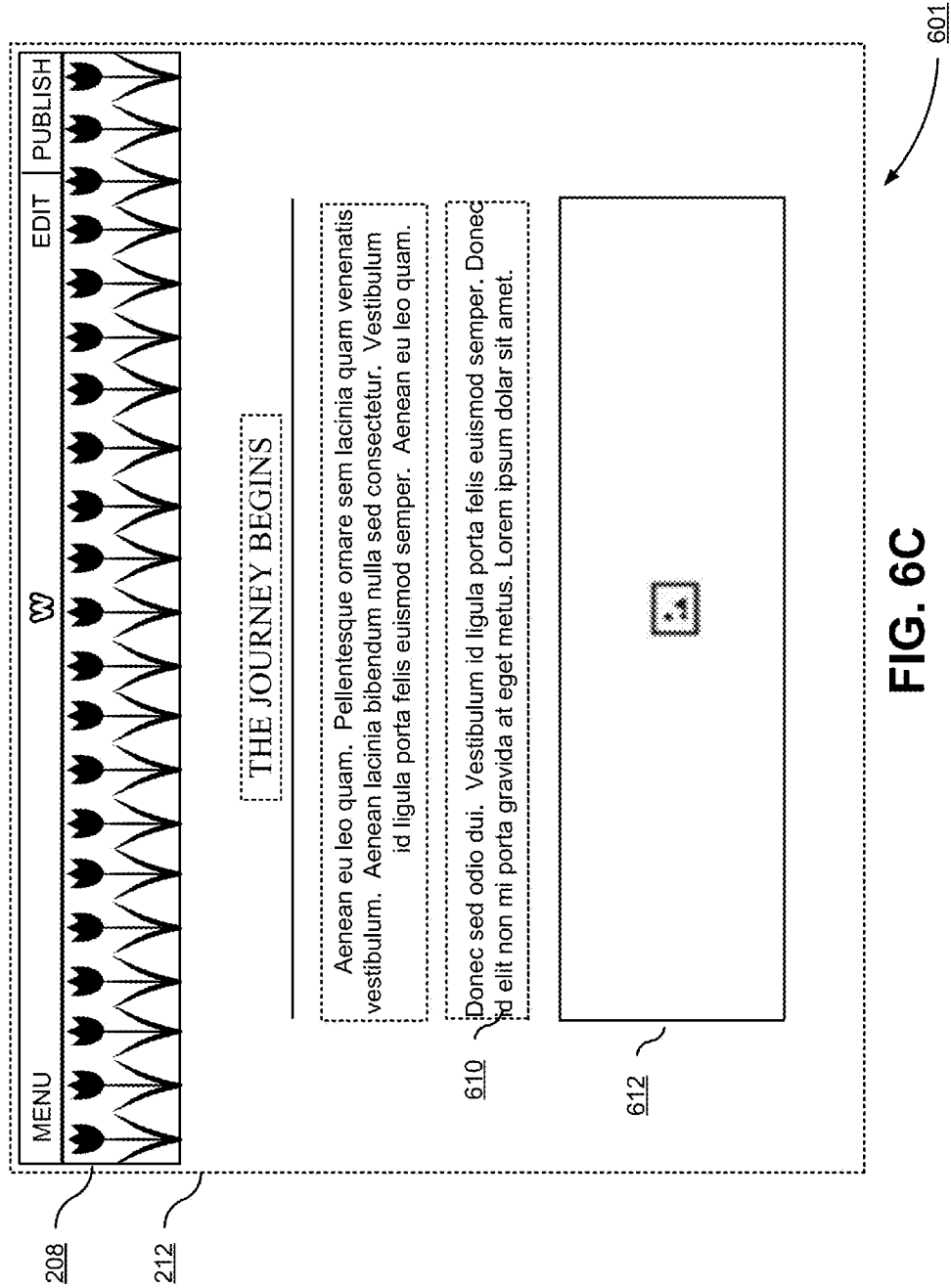

FIG. 6A is a flow chart illustrating a method 314C of interacting with cells in the native overlay 212 to add a new visual element to a web page, in accordance with an embodiment. Other embodiments may perform the steps of the method 314C in different orders or may perform additional or fewer steps. FIGS. 6B-6C illustrate an example of a visual element being added to a web page, in accordance with an embodiment. For the sake of clarity, reference numerals for visual elements of the rendered web page are not shown in FIGS. 5B-5C. Similarly, reference numerals for cells that are not explicitly referenced in the description below also are not shown in FIGS. 6B-6C. For ease of discussion, the method 314C of FIG. 6A will be described in conjunction with the example illustrated in FIGS. 6B-6C.

The method 314C begins when the user performs a long pressing gesture on an option in one of the toolbars to add a particular type of visual element to the web page 202. The interaction processing module 214 receives 602 the long pressing gesture and selects the element type corresponding to the option that was pressed. In the example shown in FIG. 6B, the user has performed a long pressing gesture on the image option 601A in the toolbar 601.

To indicate that the element type has been selected, the interaction processing module 214 displays 604 a representation of the selected element type. In one embodiment, the representation is a graphic of the selected element type. In the example shown in FIG. 6B, a graphic 605 for the image element that was selected includes an image icon and the word "Image" below the icon.

After the representation is displayed 604, the user performs a dragging gesture to drag the representation from the toolbar to a position on the rendered web page 208. The interaction processing module 214 receives 606 the dragging gesture and displays 608 an insertion point in the same manner as described above with reference to FIG. 4A. For example, if the user drags the representation 605 shown in FIG. 6B to a position near the bottom of the rendered web page 208, the module 214 displays 608 an insertion point 612 below the cell 610 corresponding to the second body text element on the page. Thus, the insertion point directs the user's attention to a location adjacent to a cell (and the corresponding visual element) and indicates to the user that a new visual element will be added at that location. When the user terminates the dragging gesture, the module 214 adds a visual element of the selected type to the location on the web page 202 corresponding to the insertion point. For example, FIG. 6C illustrates the web page after a new image element has been added below the second body text element.

The user interactions described in the methods 314A, 314B, 314C make reference to long pressing gestures and tapping gestures. The distinction between long pressing gestures and tapping gestures is merely meant to differentiate two types of input performed at the same position. In other embodiments, other types of input (e.g., using a pointing device to perform a left click or right click at the same position) may be used in place of the gestures referenced herein. In still other embodiments, the functions triggered by long pressing gestures and tapping gestures may be reversed.

The methods 300, 314A, 314B, 314C described with reference to FIGS. 3, 4A, 5A, and 6A advantageously allow the web editing application 126 to provide a responsive and interactive interface for editing web content. For example, the insertion point, which provides the user with a visual indication of the location where a visual element will be placed, is possible because the layout data 210 allows the interaction processing module 214 to determine the nearest edge of a visual element and display the insertion point at that edge. Similarly, the tooltips described in the method 314B have context-aware options that are selected based on the type of the visual element that is being edited. Selection of context-aware options is possible because the layout data 210 can be used to determine the type of the visual element corresponding to a cell when that cell is selected in the native overlay 212. Finally, the screenshot described in the method 314A can be rapidly cropped to exclude everything other than the visual element because the layout data 210 can be used to determine the corners of the visual element within the screenshot.

Physical Components of a Computer

FIG. 7 is a high-level block diagram of the components of a computing system 700 for use, for example, as the web-editing server 110 or the client device 120 shown in FIG. 1, in accordance with one embodiment. The computing system 700 includes at least one processor 702 coupled to a chipset 704. Also coupled to the chipset 704 are a memory 706, a storage device 708, a graphics adapter 712, input device(s) 714, and a network adapter 716. A display 718 is coupled to the graphics adapter 712. In one embodiment, the functionality of the chipset 704 is provided by a memory controller hub 720 and an input/output (I/O) controller hub 722. In another embodiment, the memory 706 is coupled directly to the processor 702 instead of the chipset 704.

The processor 702 is an electronic device capable of executing computer-readable instructions held in the memory 706. In addition to holding computer-readable instructions, the memory 706 also holds data accessed by the processor 702. The storage device 708 is a non-transitory computer-readable storage medium that also holds computer readable instructions and data. For example, the storage device 708 may be embodied as a solid-state memory device, a hard drive, compact disk read-only memory (CD-ROM), a digital versatile disc (DVD), or a BLU-RAY disc (BD). The input device(s) 714 may include a pointing device (e.g., a mouse or track ball), a keyboard, a touch-sensitive surface, a camera, a microphone, sensors (e.g., accelerometers), or any other devices typically used to input data into the computer 700. The graphics adapter 712 displays images and other information on the display 718. In some embodiments, the display 718 and an input device 714 are integrated into a single component (e.g., a touchscreen that includes a display and a touch-sensitive surface). The network adapter 716 couples the computing device 700 to a network, such as the network 101.

As is known in the art, a computer 700 can have additional, different, and/or other components than those shown in FIG. 7. In addition, the computer 700 can lack certain illustrated components. In one embodiment, a computer 700 acting as a server may lack input device(s) 714, a graphics adapter 712, and/or a display 718. Moreover, the storage device 708 can be local and/or remote from the computer 700. For example, the storage device 708 can be embodied within a storage area network (SAN) or as a cloud storage service.

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, computer program modules are stored on the storage device 708, loaded into the memory 706, and executed by the processor 702.

As used herein, a computer program product comprises one or more computer program modules that operate in conjunction to provide the functionality described herein. Thus, a computer program product may be stored on the storage device 708, loaded into the memory 706, and executed by the processor 702 to provide the functionality described herein.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The described embodiments also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the embodiments disclosed herein without departing from the spirit and scope as defined in the claims.

What is claimed is:

1. A non-transitory computer-readable medium storing computing instructions for making an edit to a web page on a computing device having a processor, the instructions executable to perform steps comprising:
receiving initialization data comprising instructions for rendering the web page on the computing device, the web page when rendered comprising a plurality of visual elements;
receiving layout data describing a location and a size for each of the visual elements of the rendered web page;
sending instructions, based on the layout data, to a layout generation module in an operating system of the computing device, the instructions causing the layout generation module to generate a native overlay comprising a plurality of cells, each of the cells having a location and a size matching the location and the size of a respective one of the visual elements, the computing device displaying the native overlay;

determining, based on a received user interaction with one of the cells of the native overlay, a change in the web page corresponding to the user interaction, the determining comprising:
   receiving an input from a user that selects a first cell, of the cells of the native overlay, the input selecting the first cell;
   taking a screenshot of the rendered web page;
   determining, based on the layout data, a region within the rendered web page that includes the visual element corresponding to the selected first cell;
   generating a visual element image, the visual element image comprising a portion of the rendered web page inside the determined region, wherein the portion of the rendered web page inside the determined region is the screenshot cropped to display the visual element corresponding to the selected first cell;
   sending instructions to modify the native overlay, the modification causing the visual element corresponding to the selected first cell to be hidden from the user;
   receiving a second input from the user that identifies a new position; and
   responsive to receiving the second input, sending instructions to display the visual element image at the new position; and
providing the change in the web page to a web rendering module, the web rendering module configured to render an updated web page that incorporates the change.

2. The computer-readable medium of claim 1, further comprising instructions that when executed cause the processor to:
   receiving, from the web rendering module, updated layout data describing a location and a size for each of the visual elements of the web page;
   generating, based on the updated layout data, an updated native overlay comprising a plurality of cells, each of the cells having a location and a size matching one of the visual elements; and
   displaying the updated native overlay.

3. The computer-readable medium of claim 1, wherein determining a change in the web page further comprises:
   responsive to receiving the second input from the user that identifies the new position, determining, based on the layout data, an edge of a cell nearest to the new position; and
   sending instructions to display an insertion point at the determined edge; and
   determining that the change in the web page comprises moving the visual element corresponding to the selected cell to a position on the web page corresponding to the determined edge.

4. The computer-readable medium of claim 1, wherein the instructions further include steps comprising wherein:
   receiving a tapping gesture on one of the cells of the native overlay, the tapping gesture selecting the cell;
   identifying, based on the layout data, the visual element corresponding to the selected cell;
   sending instructions to display a tooltip at a position proximate to the selected cell, the tooltip comprising an option to delete the visual element;
   receiving a selection of the option to delete the visual element;
   determining that the change in the web page comprises a deletion of the visual element.

5. The computer-readable medium of claim 1, wherein the instructions further include steps comprising:
   receiving a tapping gesture on one of the cells of the native overlay, the tapping gesture selecting the cell;
   identifying, based on the layout data, the visual element corresponding to the selected cell, the visual element having an element type;
   sending instructions to display a tooltip at a position proximate to the selected cell, the tooltip comprising one or more edit options to edit the visual element, the options selected based on the element type;
   receiving a selection of one of the edit options; and
   determining that the change in the web page comprises an edit associated with the selected edit option.

6. The computer-readable medium of claim 1, wherein the instructions further include steps comprising:
   sending instructions to display a toolbar comprising a plurality of options, each option corresponding to a predetermined type of visual element; and
   receiving a long pressing gesture on one of the options of the toolbar, the long pressing gesture selecting the corresponding element type;
   sending instructions to display a visual representation of the selected element type;
   receiving a dragging gesture from a position corresponding to the selected element type to a position adjacent to a cell on the native overlay; and
   responsive to receiving the dragging gesture, sending instructions to display the representation of the selected element type at the position on the native overlay.

7. The computer-readable medium of claim 6, wherein the instructions further include steps comprising:
   responsive to receiving the dragging gesture from the position corresponding to the selected element type to the position on the native overlay, determining, based on the layout data, an edge of a cell nearest to the position on the native overlay;
   sending instructions to display an insertion point at the determined edge; and
   determining that the change in the web page comprises creating a new element of the selected element type at a position on the web page corresponding to the determined edge.

8. A method for making an edit to a web page on a computing device, comprising:
   receiving initialization data comprising instructions for rendering the web page on the computing device, the web page when rendered comprising a plurality of visual elements;
   receiving layout data describing a location and a size for each of the visual elements of the rendered web page;
   sending instructions, based on the layout data, to a layout generation module in an operating system of the computing device, the instructions causing the layout generation module to generate a native overlay comprising a plurality of cells, each of the cells having a location and a size matching the location and the size of a respective one of the visual elements, the computing device displaying the native overlay;
   determining, based on a received user interaction with one of the cells of the native overlay, a change in the web page corresponding to the user interaction, the determining comprising:
      receiving an input from a user that selects a first cell, of the cells of the native overlay, the input selecting the first cell;

taking a screenshot of the rendered web page;
determining, based on the layout data, a region within the rendered web page that includes the visual element corresponding to the selected first cell;
generating a visual element image, the visual element image comprising a portion of the rendered web page inside the determined region, wherein the portion of the rendered web page inside the determined region is the screenshot cropped to the visual element corresponding to the selected first cell;
sending instructions to modify the native overlay, the modification causing the visual element corresponding to the selected first cell to be hidden from the user;
receiving a second input from the user that identifies a new position; and
responsive to receiving the second input, sending instructions to display the visual element image at the new position; and
providing the change in the web page to a web rendering module, the web rendering module configured to render an updated web page that incorporates the change.

9. The method of claim 8, further comprising:
receiving, from the web rendering module, updated layout data describing a location and a size for each of the visual elements of the web page;
generating, based on the updated layout data, an updated native overlay comprising a plurality of cells, each of the cells having a location and a size matching one of the visual elements; and
displaying the updated native overlay.

10. The method of claim 8, further comprising:
responsive to receiving the second input from the user that identifies the new position, determining, based on the layout data, an edge of a cell nearest to the new position; and
sending instructions to display an insertion point at the determined edge; and
determining that the change in the web page comprises moving the visual element corresponding to the selected cell to a position on the web page corresponding to the determined edge.

11. The method of claim 8, further comprising:
receiving a tapping gesture on one of the cells of the native overlay, the tapping gesture selecting the cell;
identifying, based on the layout data, the visual element corresponding to the selected cell;
sending instructions to display a tooltip at a position proximate to the selected cell, the tooltip comprising an option to delete the visual element;
receiving a selection of the option to delete the visual element;
determining that the change in the web page comprises a deletion of the visual element.

12. The method of claim 8, further comprising:
receiving a tapping gesture on one of the cells of the native overlay, the tapping gesture selecting the cell;
identifying, based on the layout data, the visual element corresponding to the selected cell, the visual element having an element type;
sending instructions to display a tooltip at a position proximate to the selected cell, the tooltip comprising one or more edit options to edit the visual element, the options selected based on the element type;
receiving a selection of one of the edit options; and
determining that the change in the web page comprises an edit associated with the selected edit option.

13. The method of claim 8, further comprising:
sending instructions to display a toolbar comprising a plurality of options, each option corresponding to a predetermined type of visual element; and
receiving a long pressing gesture on one of the options of the toolbar, the long pressing gesture selecting the corresponding element type;
sending instructions to display a visual representation of the selected element type;
receiving a dragging gesture from a position corresponding to the selected element type to a position adjacent to a cell on the native overlay; and
responsive to receiving the dragging gesture, sending instructions to display the representation of the selected element type at the position on the native overlay.

14. The method of claim 13, further comprising:
responsive to receiving the dragging gesture from the position corresponding to the selected element type to the position on the native overlay, determining, based on the layout data, an edge of a cell nearest to the position on the native overlay;
sending instructions to display an insertion point at the determined edge; and
determining that the change in the web page comprises creating a new element of the selected element type at a position on the web page corresponding to the determined edge.

15. A system for making an edit to a web page, comprising:
a computer processor; and
a computer-readable storage medium storing processor-executable computer program instructions, the computer program instructions comprising instructions for:
receiving initialization data comprising instructions for rendering the web page on the computing device, the web page when rendered comprising a plurality of visual elements;
receiving layout data describing a location and a size for each of the visual elements of the rendered web page;
sending instructions, based on the layout data, to a layout generation module in an operating system of the computing device, the instructions causing the layout generation module to generate a native overlay comprising a plurality of cells, each of the cells having a location and a size matching the location and the size of a respective one of the visual elements, the computing device displaying the native overlay;
determining, based on a received user interaction with one of the cells of the native overlay, a change in the web page corresponding to the user interaction, the determining comprising:
receiving an input from a user that selects a first cell, of the cells of the native overlay, the input selecting the cell;
taking a screenshot of the rendered web page;
determining, based on the layout data, a region within the rendered web page that includes the visual element corresponding to the selected first cell;
generating a visual element image, the visual element image comprising a portion of the rendered web page inside the determined region, wherein the portion of the rendered web page inside the determined region is the screenshot cropped to the visual element corresponding to the selected first cell;

sending instructions to modify the native overlay, the modification causing the visual element corresponding to the selected first cell to be hidden from the user;

receiving a second input from the user that identifies a new position; and responsive to receiving the second input, sending instructions to display the visual element image at the new position; and providing the change in the web page to a web rendering module, the web rendering module configured to render an updated web page that incorporates the change.

16. The system of claim 15, wherein the computer program instructions further comprise instructions for:

receiving, from the web rendering module, updated layout data describing a location and a size for each of the visual elements of the web page;

generating, based on the updated layout data, an updated native overlay comprising a plurality of cells, each of the cells having a location and a size matching one of the visual elements; and displaying the updated native overlay.

17. The system of claim 15, wherein the computer program instructions further comprise instructions for:

responsive to receiving the second input from the user that identifies the new position, determining, based on the layout data, an edge of a cell nearest to the new position; and sending instructions to display an insertion point at the determined edge; and determining that the change in the web page comprises moving the visual element corresponding to the selected cell to a position on the web page corresponding to the determined edge.

* * * * *